US010002724B2

(12) United States Patent
Yu

(10) Patent No.: US 10,002,724 B2
(45) Date of Patent: Jun. 19, 2018

(54) SWITCH ACTUATOR WITH HAPTIC AND AUDIBLE FEEDBACK

(71) Applicant: Zhengming Yu, Huizhou (CN)

(72) Inventor: Zhengming Yu, Huizhou (CN)

( * ) Notice: Subject to any disclaimer, the term of this patent is extended or adjusted under 35 U.S.C. 154(b) by 0 days. days.

(21) Appl. No.: 15/482,850

(22) Filed: Apr. 10, 2017

(65) Prior Publication Data

US 2017/0213666 A1 Jul. 27, 2017

Related U.S. Application Data

(63) Continuation of application No. PCT/CN2015/099415, filed on Dec. 29, 2015.

(30) Foreign Application Priority Data

Dec. 29, 2014 (CN) .......................... 2014 1 0832784
Mar. 27, 2015 (CN) .......................... 2015 1 0138497

(51) Int. Cl.
H01H 13/705 (2006.01)
H01H 13/14 (2006.01)
(Continued)

(52) U.S. Cl.
CPC ............ *H01H 13/14* (2013.01); *H01H 13/10* (2013.01); *H01H 13/70* (2013.01); *H01H 13/705* (2013.01);
(Continued)

(58) Field of Classification Search
CPC ............ H01H 13/7065; H01H 13/705; H01H 2215/002; H01H 2215/03; H01H 2235/00
(Continued)

(56) References Cited

U.S. PATENT DOCUMENTS 3,674,970 A * 7/1972 Bedocs ................ H01H 13/506
200/295
4,935,591 A * 6/1990 Kaneko .................. H01H 13/02
200/293
(Continued)

FOREIGN PATENT DOCUMENTS

CN 2176595 Y 9/1994
CN 201194201 Y 2/2009
(Continued)

OTHER PUBLICATIONS

SIPO, International Search Report, PCT Patent Application No. PCT/CN2015/099415.
(Continued)

Primary Examiner — Vanessa Girardi
(74) Attorney, Agent, or Firm — Hemisphere Law, PLLC; Zhigang Ma

(57) ABSTRACT

A thin switch includes a pressing cup (1), a base (2) and a top cover (3). A conductive component (4), a spring (5), a fixed terminal (6) and an elastic wire (7) are disposed in a space defined by buckling the base and the top cover. The elastic wire is arranged below the conductive component, one end of the elastic wire is fixed on the base and the other end is disposed under a boss of the pressing cup. When the pressing cup is pressed down, the conductive component is driven to contact the fixed terminal to turn on the switch, and the elastic wire is driven to descend at the same time. When the pressing cup is pressed down to a preset position, the elastic wire separates from the pressing cup, and bounces back upwards to strike the dome to make a sound.

16 Claims, 6 Drawing Sheets

(51) Int. Cl.
*H01H 13/10* (2006.01)
*H01H 13/70* (2006.01)

(52) U.S. Cl.
CPC ..... *H01H 2215/03* (2013.01); *H01H 2235/00* (2013.01)

(58) Field of Classification Search
USPC .............. 200/341, 345, 521; 400/472, 491.2, 400/491.3
See application file for complete search history.

(56) References Cited

U.S. PATENT DOCUMENTS

| | | | | |
|---|---|---|---|---|
| 4,939,327 A | * | 7/1990 | Wu ........................ | H01H 13/50 200/341 |
| 5,075,524 A | * | 12/1991 | Klatt ...................... | H01H 13/52 200/407 |
| 5,442,152 A | | 8/1995 | Huang | |

FOREIGN PATENT DOCUMENTS

| CN | 204424102 U | 6/2015 |
|---|---|---|
| CN | 104992854 A | 10/2015 |

OTHER PUBLICATIONS

Search Report and Notification of First Office Action of CN201510138491.8.

\* cited by examiner

SWITCH ACTUATOR WITH HAPTIC AND AUDIBLE FEEDBACK

CROSS-REFERENCE TO RELATED APPLICATIONS

The present application is a continuation of PCT application No. PCT/CN2015/099415, filed on Dec. 29, 2015, which designates United States and claims priority of China Patent Application No. 201410832784.4, filed on Dec. 29, 2014, and China Patent Application No. 201510138497.8, filed on Mar. 27, 2015, contents of which are incorporated herein by reference.

BACKGROUND OF THE INVENTION

1. Technical Field

The invention relates to the technical field of switches.

2. Description of Related Art

For most operation of existing equipment, a thin switch is needed to serve as an input means, the experience of input equipment depends on the quality of the thin switch, and thus good hand feeling and long service life need to be guaranteed. According to an existing thin switch using a metal sheet as a movable contact, the elastic force of the metal sheet is relatively insufficient due to the limitation of the internal space of the switch, and consequentially the key pressing hand feeling and service life are affected.

BRIEF DESCRIPTION OF THE SEVERAL VIEWS OF THE DRAWINGS

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1:
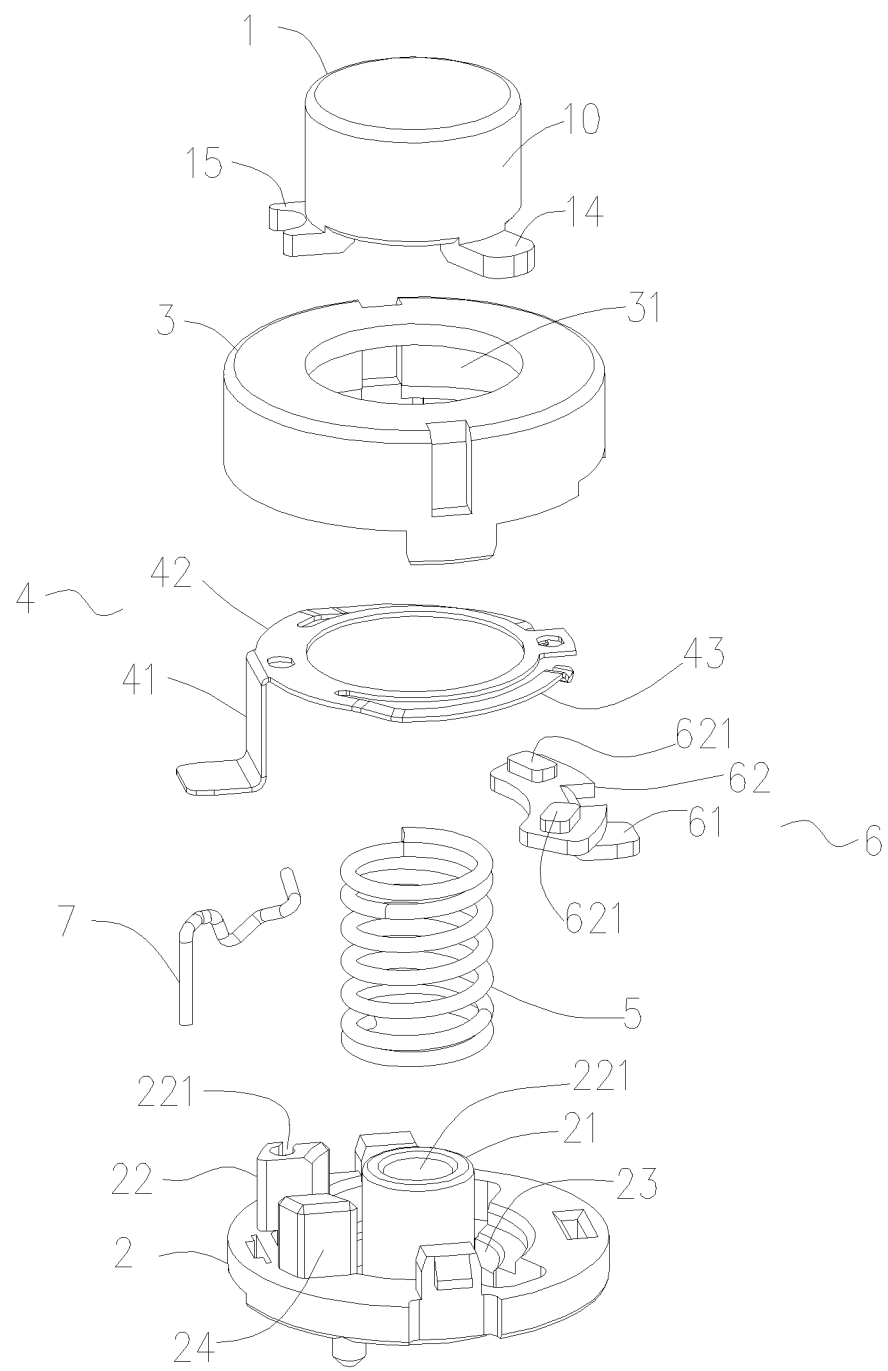
FIG. 1 is an explosive structure schematic diagram of a thin switch according to an embodiment of the invention.
Figure 2:
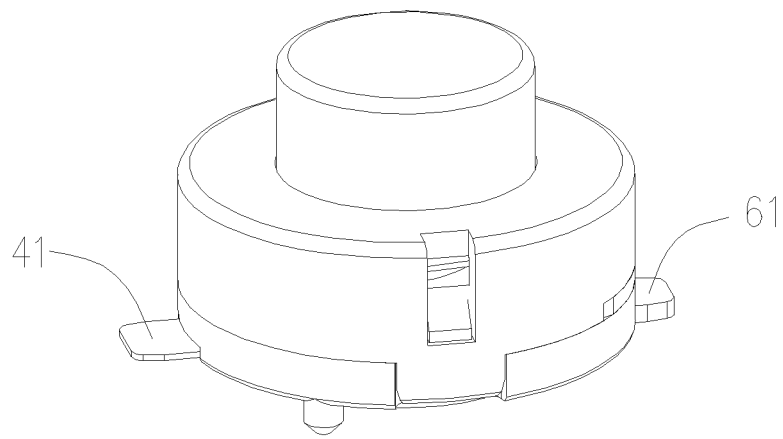
FIG. 2 is a perspective schematic diagram of the thin switch.
Figure 3:
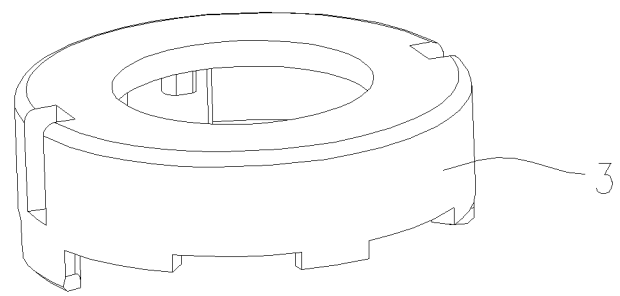
FIG. 3 is a semi-assembled structure schematic diagram of the thin switch.
Figure 3:
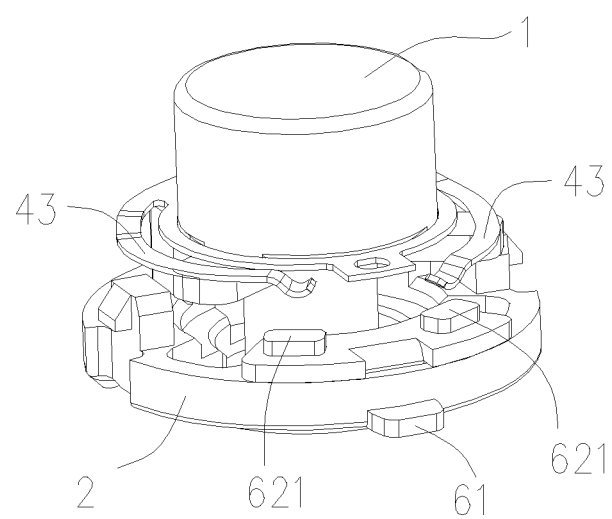
Figure 4:
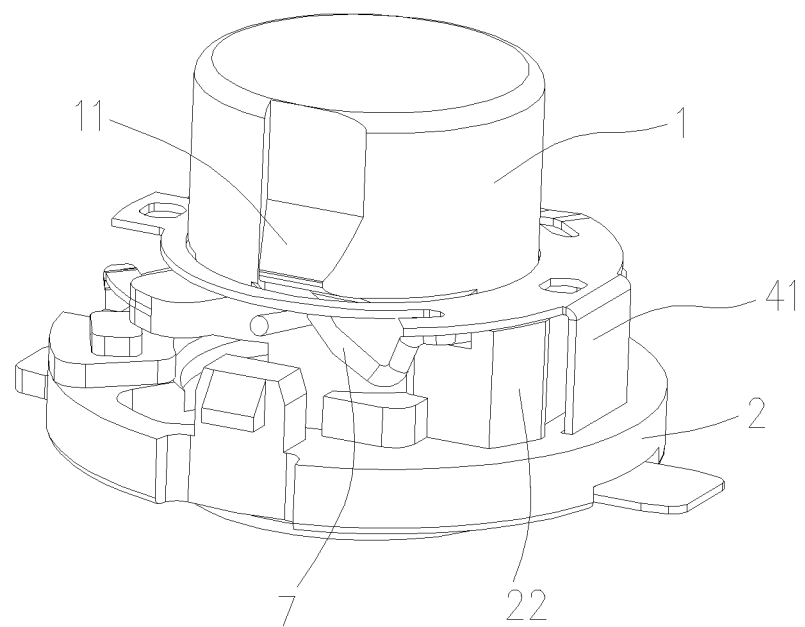
FIG. 4 is another semi-assembled structure schematic diagram of the thin switch of the invention.
Figure 5:
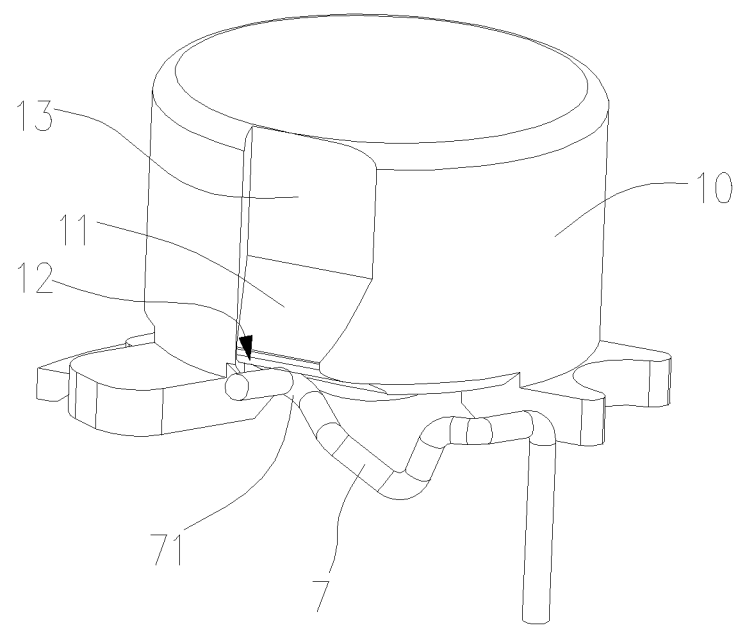
FIG. 5 is a perspective structure diagram of a pressing cup and an elastic wire of the thin switch of the invention.

As is shown in FIGS. 1-5, a thin switch in the embodiment includes a pressing cup 1, a base 2, a top cover 3, an annular conductive component 4, a spring 5, a fixed terminal 6, and an elastic wire 7. The base 2 and the top cover 3 are buckled to form a receiving space used for receiving the pressing cup 1, the annular conductive component 4, the spring 5, the fixed terminal 6, and the elastic wire 7. A guide column 21 protrudes upwardly from the middle of the base 2, and a hole 211 is defined in a top surface of the guide column 21. The spring 5 is sleeved on the guide column 21, and a height of the spring 5 is higher than that of the column 21. A receiving groove 23 corresponding to a shape of a lower portion of the pressing cup 1 is defined around the guide column 21.

The pressing cup 1 is covered on the guide column 21 and supported by the spring 5. A guide rod (not shown) corresponding to the hole 211 in the guide column 21 extends downwardly from the pressing cup and is inserted in the hole 211. The pressing cup 1 includes a boss 12 protruding outwardly from a side wall 10 of the pressing cup. The boss 12 is used for pressing against a second end of the elastic wire 7 for a moment during a downward movement of the pressing cup 1. The pressing cup 1 further includes two lug bosses 14, 15 protruding outwardly from a lower edge of the side wall 10 of the pressing cup 1.

The fixed terminal 6 includes an electrical insulating arc-shaped plate 62 secured to the base 2 at a position outside the receiving groove 23, two conductive contacts 621 configured on a top surface of the arc-shaped plate 62, and a first IO terminal 61 electrically connected with the two conductive contacts 621 and protruding out of the base 21 from an opening.

The annular conductive component 4 includes an annular sheet 42 sleeved on the pressing cup 1 above the lug bosses 14, 15, two flexible arms 43 extending from the annular sheet 1 and bending downwardly towards the two conductive contacts 621 of the fixed terminal 6 and a second IO terminal 41. The base further includes a first post 24 extending upwardly from the base 2. The annular sheet 42 is fixed at the top of the first post 24. The two arms 43 extends from the annular sheet 1 from positions near the two sides of the first post 24, and extends close to the periphery of the annular sheet 42 and bend downwardly towards the contacts 621 at the same time. Therefore, the annular sheet 42 is fixed at the first post 24 at a position opposite to the free ends of the two flexible arms. A height of the first post 24 is such designed that the annular sheet is at a position near the top of the spring, thus the two lug bosses 14, 15 of the pressing cup 1 support the two flexible arms 43 respectively, and separate the two flexible arms 43 with the two conductive contacts 621 of the fixed terminal 6 during the time the pressing cup 1 is not pressed, and the thin switch is off. When the pressing cup 1 is pressed down to a preset position, the two flexible arms 43 can electrically connected with the two conductive contacts 621, thus the thin switch is switched on.

The second IO terminal 41 is a L-shaped strip with one end connected with the annular sheet 42 at a position near the first post 24 and the other end protruding out of the base 2 from another opening defined in a side wall of the base 2. The other end of the second IO terminal 41 and the first IO terminal 61 are used for connecting with an external circuit. In detail, the second IO terminal 41 extends downwards from the annular sheet 42, then bends to extends out of the base 2 from another opening defined in the side wall of the base 2.

The top cover 3 is connected with the base 2 to forming the above-described receiving space. An opening 31 is defined in a top surface of the top cover 3 to allow an upper part of the pressing cup 1 to protruding out.

The base 2 further includes a second post 22 extending upwardly at a position outside the receiving groove 23. A fixing hole 221 is defined in a top of the second post 22.

A first end of the elastic wire 7 is inserted into the fixing hole 221 and fixed to the second post 22, and a second end of the elastic wire 7 extends to a position under the boss 12 of the pressing cup 1. In detail, the elastic wire 7 firstly extends upwards, then bends to extend substantially horizontally, then bends to extend downwardly, then bends to extend upwardly again, and finally extends towards a underside of the boss 12 to form an elastic and resilient structure. Furthermore, the second end of the elastic wire 7 is further provided with a transverse bent part 71 which is substantially a inversus V-shaped used for pressing and knocking.

It is understandably, the elastic wire 7 is configured below the annular sheet 42, and only the second end of the elastic wire 7 is below the boss 12 of the pressing cup, the other part of the elastic wire 7 is not pressed and contacted by the pressing cup 1 during operation.

In the embodiment, the pressing cup 1 further defines a guide inclined surface 11, in its side wall 10, extending upwardly and tiltly from an upper edge of the boss 12, and a guide vertical surface 13 extending upwardly and vertically from an upper edge of the guide inclined surface 11. Therefore, the guide inclined surface 11 and the guide vertical surface 13 are look like sunk in the side wall 10 of the pressing cup 1.

In operation, when the pressing cup 1 is pressed downwardly, the spring 5 is compressed, the two flexible arms 43 of the annular conductive component 4 is driven to descend and contact with the two conductive contacts 621 of the fixed terminal 6 to turn on the thin switch, and the second end of the elastic wire 7 is pressed downwards accordingly by the boss 12 of the pressing cup 1 at the same time. When the pressing cup 1 moves down to a preset position, the second end of the elastic wire 7 slides beyond an edge of the boss 12 and bounces back upwards to strike the annular conductive component 4 to make a sound.

Because of the existing of the guide inclined surface 11 and the guide vertical surface 13, a friction noisy between the second end of the elastic wire 7 and the side wall 10 of the pressing cup 1 is avoid.

A size of the thin switch is not enlarged when the elastic wire is added, and an internal space of the thin switch is fully utilized. The thin switch has a good touch sense and auditory sense when pressed, and the invention is particularly suitable for small switches. Meanwhile, the switch is provided with two contacts 621 on the fixed terminal, thereby having higher contact reliability. Also, the thin switch is simple in structure and long in service life and has good application prospects, for example, the thin switch can be applied to existing keyboard switches; the switch can meet the requirement for light and thin keyboard switches and has good hand feeling and auditory sense by being matched with the scissor supporter.

It is understandably, there can only be one contact on the top of the fixed terminal and one flexible arm on the conductive component 4. A shape of the elastic wire is not limited to the above described embodiment, it can be substantially V-shaped or L-shaped in other embodiment.

Figure 6:
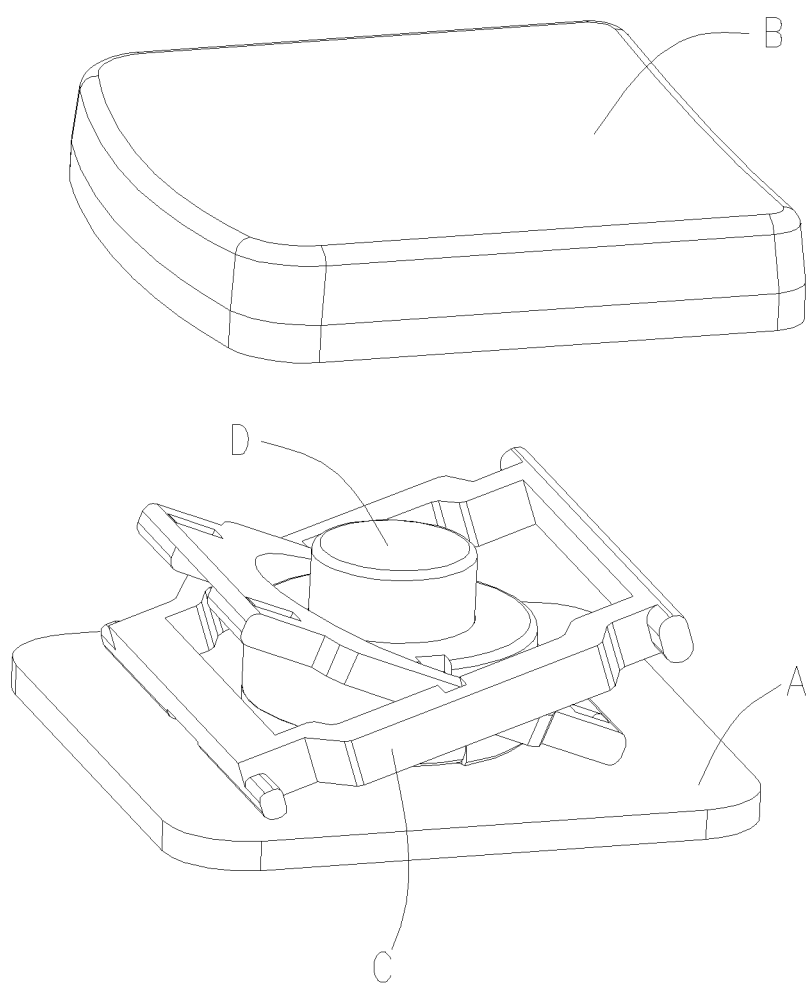
FIG. 6 is an explosive structure schematic diagram of a keyboard switch according to an embodiment of the invention.
Figure 7:
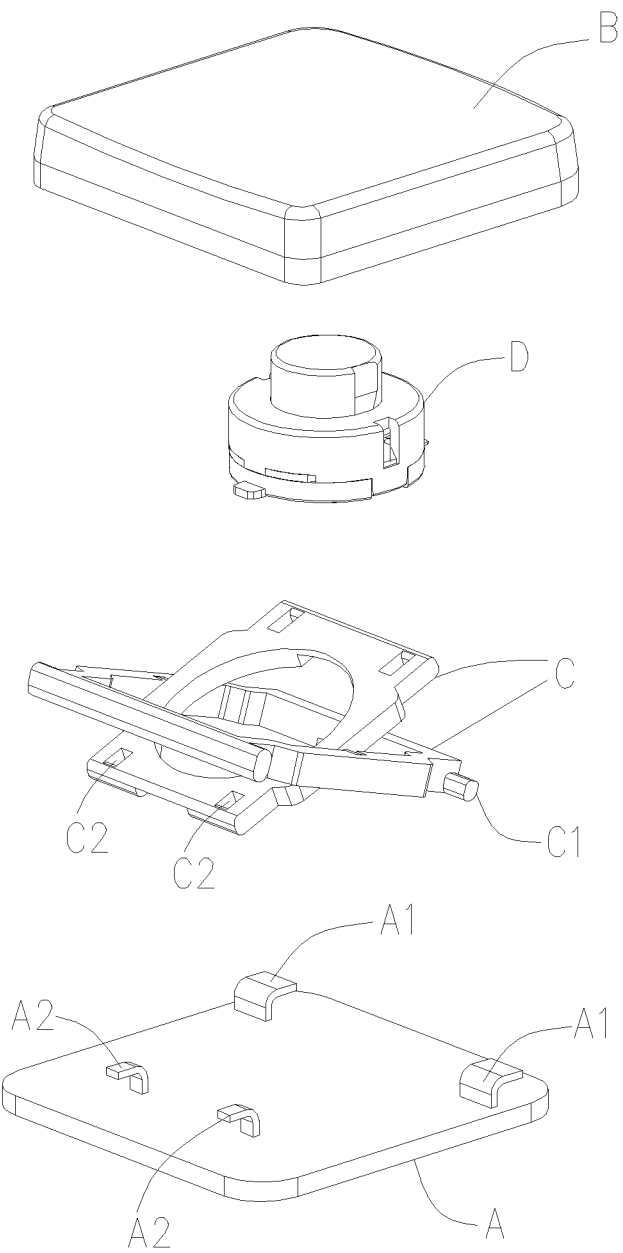
FIG. 7 is another explosive structure schematic diagram of the keyboard switch of the invention.
Figure 8:
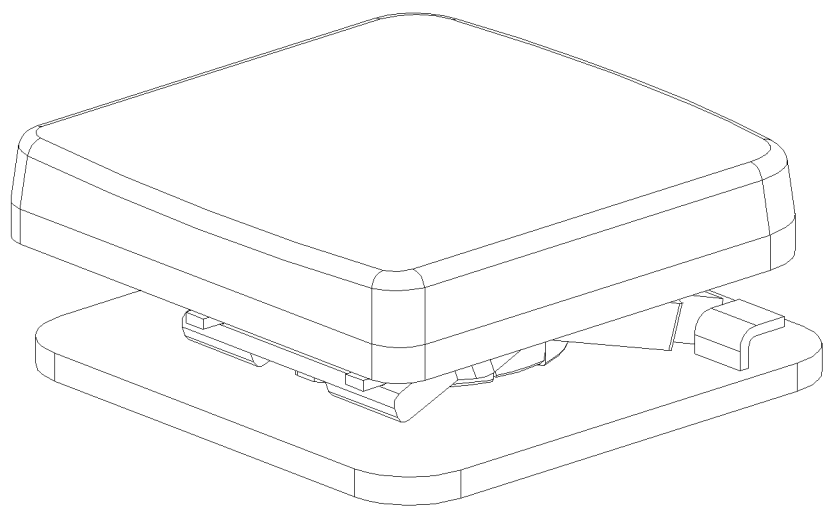
FIG. 8 is a perspective structure schematic diagram of the keyboard switch of the invention.
Figure 9:
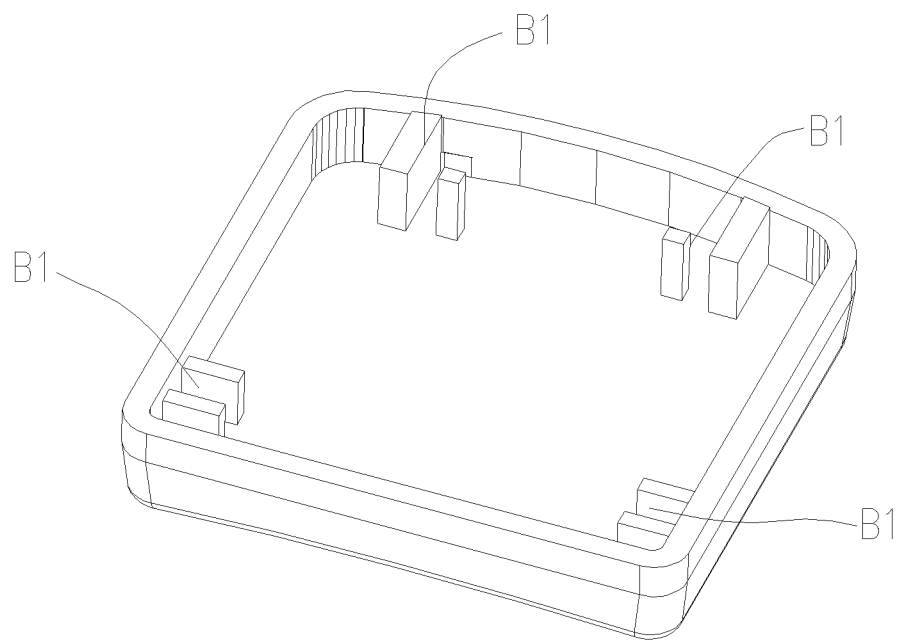
FIG. 9 is a perspective structure schematic diagram of a key cap of the keyboard switch of the invention.

FIGS. 6-9 illustrate a keyboard switch utilizing the thin switch described in the above embodiment. In the embodiment, the keyboard switch includes a base plate A, a key cap B, a scissor supporter C and a thin switch D. Four L-shaped barbs A1 and A2 are arranged on the base plate A and barb columns C1 and barb holes C2 are configured at a lower part of the scissor supporter C correspondingly. The barb columns C1 and barb holes C2 hook the four L-shaped barbs A1 and A2 to connected the scissor supporter C and the base plate A in a clamped mode. The thin switch D is arranged in the middle of the scissor supporter C and welded to the base plate A. The key cap B is installed on two upper beams of the scissor supporter C through buckles B1. That is, the scissor supporter C supports the key cap B above the thin switch D.

In operation, the key cap B is pressed, and the pressing cup 1 of the thin switch is pressed indirectly by the key cap B, so that the switch is turned on, and scissor supporter C is also pressed at the same time; the spring 5 restores when the external force is eliminated, so that the pressing cup 1 rebounds upwards, the key cap B is ejected at the same time, and the key cap B is also supported by the scissor supporter C. The structures of the scissor supporter C are the same as the common structures of an existing keyboard switch, and the scissor supporter C are used for balancing a key cap so that all corners of the key cap can be pressed downwards in a balanced mode. In the application of the keyboard switch, the base plate A is not necessary to serve as a part of the switch, and the base plate A is an iron fixing plate of a keyboard.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A thin switch, comprising:
   a base (2) comprising a guide column protruding upwardly;
   a spring (5) sleeved on the guide column;
   a fixed terminal (6) secured to the base, comprising at least one conductive contact configured on a top surface thereof and a first IO terminal electrically connected with the at least one conductive contact and protruding out of the base;
   a pressing cup (1) covered on the guide column and supported by the spring, comprising a boss protruding outwardly from a side wall thereof;
   an annular conductive component (4) comprising a second IO terminal protruding out of the base and an annular part sleeved on the pressing cup;
   an elastic wire (7) with a first end fixed to the base and a second end extending to a position under the boss of the pressing cup; and
   a top cover (3) connected with the base to forming a receiving space and defining an opening to allow an upper part of the pressing cup to protruding out thereof;
   wherein when the pressing cup is pressed downwardly, the spring is compressed, at least a part of the annular conductive component is driven to descend and contact with the at least one conductive contact of the fixed terminal to turn on the switch, and the second end of the elastic wire is pressed downwards accordingly by the boss at the same time;
   wherein when the pressing cup moves down to a preset position, the second end of the elastic wire slides beyond an edge of the boss and bounces back upwards to strike the annular conductive component to make a sound.

2. The thin switch according to claim 1, wherein a receiving groove (23) is defined in the base, around the guide column (21) and configured for receiving a lower part of the pressing cup.

3. The thin switch according to claim 1, wherein the pressing cup (1) further comprises two lug bosses protruding outwardly from a lower edge of the side wall of the pressing cup; the annular conductive component (4) further comprises an annular sheet sleeved on the pressing cup above the lug bosses, two flexible arms extending from the annular sheet and bending downwardly towards the at least one conductive contact of the fixed terminal (6); the two lug bosses support the two flexible arms respectively, and separate the two flexible arms with the at least one conductive contact of the fixed terminal when the pressing cup is not pressed; when the pressing cup is pressed down to a preset position, the two flexible arms can electrically connected with the at least one conductive contact.

4. The thin switch according to claim 3, wherein a first post extends upwardly from the base, the annular sheet is fixed at the top of the first post at a position opposite to the two flexible arms; the second IO terminal is a L-shaped strip with one end connected with the annular sheet and the other end protruding out of the base.

5. The thin switch according to claim 1, wherein a second post (22) extends upwardly from the base, a fixing hole is defined in a top of the second post; the first end of the elastic wire (7) is inserted into the fixing hole and fixed to the second post, the elastic wire then extends upwards firstly, then bends to extend substantially horizontally, then bends to extend downwardly, then bends to extend upwardly again, and finally extends towards a underside of the boss to form an elastic and resilient structure.

6. The thin switch according to claim 5, wherein the second end of the elastic wire (7) is provided with an inversus V-shaped part used for pressing and knocking.

7. The thin switch according to claim 5, wherein the pressing cup defines a guide inclined surface (11), in the side wall thereof, extending upwardly and tiltly from an upper edge of the boss.

8. The thin switch according to claim 7, wherein the pressing cup further defines a guide vertical surface extending upwardly and vertically from an upper edge of the guide inclined surface.

9. A keyboard switch, comprising:
a base plate (A);
a thin switch (D) fixed on the base plate;
a key cap (B);
a scissor supporter (C) fixed on the base plate and supporting the key cap above the thin switch;
wherein the thin switch comprises:
a base (2) comprising a guide column protruding upwardly;
a spring (5) sleeved on the guide column;
a fixed terminal (6) secured to the base, comprising at least one conductive contact configured on a top surface thereof and a first IO terminal electrically connected with the at least one conductive contact and protruding out of the base;
a pressing cup (1) covered on the guide column and supported by the spring, comprising a boss protruding outwardly from a side wall thereof;
an annular conductive component (4) comprising a second IO terminal protruding out of the base and an annular part sleeved on the pressing cup;
an elastic wire (7) with a first end fixed to the base and a second end extending to a position under the boss of the pressing cup; and
a top cover (3) connected with the base to forming a receiving space and defining an opening to allow an upper part of the pressing cup to protruding out thereof;
wherein when the key cap is pressed downwardly, the pressing cup is pressed downwardly by the key cap, the spring is compressed, at least a part of the annular conductive component is driven to descend and contact with the at least one conductive contact of the fixed terminal to turn on the switch, and the second end of the elastic wire is pressed downwards accordingly by the boss at the same time;
wherein when the pressing cup moves down to a preset position, the second end of the elastic wire slides beyond an edge of the boss and bounces back upwards to strike the annular conductive component to make a sound.

10. The keyboard switch according to claim 9, wherein a receiving groove (23) is defined in the base, around the guide column (21) and is configured for receiving a lower part of the pressing cup.

11. The keyboard switch according to claim 9, wherein the pressing cup (1) further comprises two lug bosses protruding outwardly from a lower edge of the side wall of the pressing cup; the annular conductive component (4) further comprises an annular sheet sleeved on the pressing cup above the lug bosses, two flexible arms extending from the annular sheet and bending downwardly towards the at least one conductive contact of the fixed terminal (6); the two lug bosses support the two flexible arms respectively, and separate the two flexible arms with the at least one conductive contact of the fixed terminal when the pressing cup is not pressed; when the pressing cup is pressed down to a preset position, the two flexible arms can electrically connected with the at least one conductive contact.

12. The keyboard switch according to claim 11, wherein a first post extends upwardly from the base, the annular sheet is fixed at the top of the post at a position opposite to the two flexible arms; the second IO terminal is a L-shaped strip with one end connected with the annular sheet and the other end protruding out of the base.

13. The keyboard switch according to claim 9, wherein a second post (22) extends upwardly from the base, a fixing hole is defined in a top of the second post; the first end of the elastic wire (7) is inserted into the fixing hole and fixed to the second post, the elastic wire then extends upwards firstly, then bends to extend substantially horizontally, then bends to extend downwardly, then bends to extend upwardly again, and finally extends towards a underside of the boss to form an elastic and resilient structure.

14. The keyboard switch according to claim 13, wherein the second end of the elastic wire (7) is provided with an inversus V-shaped part used for pressing and knocking.

15. The keyboard switch according to claim 13, wherein the pressing cup defines a guide inclined surface (11), in the side wall thereof, extending upwardly and tiltly from an upper edge of the boss.

16. The keyboard switch according to claim 15, wherein the pressing cup further defines a guide vertical surface extending upwardly and vertically from an upper edge of the guide inclined surface.

\* \* \* \* \*